United States Patent [19]
Alexander

[11] Patent Number: 5,621,179
[45] Date of Patent: Apr. 15, 1997

[54] ROTARY TRANSDUCER

[75] Inventor: Alfred J. Alexander, Kent, England

[73] Assignee: Penny & Giles Blackwood Limited, England

[21] Appl. No.: 448,440

[22] PCT Filed: Dec. 8, 1993

[86] PCT No.: PCT/GB93/02510

§ 371 Date: Jun. 5, 1995

§ 102(e) Date: Jun. 5, 1995

[87] PCT Pub. No.: WO94/14027

PCT Pub. Date: Jun. 23, 1994

[30] Foreign Application Priority Data

Dec. 12, 1992 [GB] United Kingdom ............... 9225971

[51] Int. Cl.$^6$ ............................................. G01B 7/30
[52] U.S. Cl. ................... 73/862.331; 73/862.332; 324/207.16; 324/207.25
[58] Field of Search ................. 324/207.16, 207.22, 324/207.25; 73/862.331, 862.332

[56] References Cited

U.S. PATENT DOCUMENTS

| | | | |
|---|---|---|---|
| 4,717,874 | 1/1988 | Ichikawa et al. | 324/207.16 |
| 4,746,859 | 5/1988 | Malik | 324/207.25 |
| 4,829,247 | 5/1989 | Wallrafen | 324/208 |
| 4,991,301 | 2/1991 | Hore | 33/366 |
| 5,233,296 | 8/1993 | Maeda et al. | 324/207.22 |
| 5,323,109 | 6/1994 | Mehnert et al. | 324/207.17 |
| 5,349,293 | 9/1994 | Tanaka et al. | 324/207.16 |
| 5,394,760 | 3/1995 | Persson et al. | 73/862.331 |
| 5,428,290 | 6/1995 | Porcher | 324/207.16 |
| 5,430,372 | 7/1995 | Hecht | 324/207.16 |
| 5,442,956 | 8/1995 | Persson | 73/118.1 |
| 5,475,302 | 12/1995 | Mehnert et al. | 324/207.17 |

FOREIGN PATENT DOCUMENTS

| | | |
|---|---|---|
| 0337939 | 10/1989 | European Pat. Off. |
| 4102478 | 5/1991 | Germany |
| 4001544 | 7/1991 | Germany |
| 2231161 | 11/1990 | United Kingdom |

*Primary Examiner*—Hezron E. Williams
*Assistant Examiner*—Richard A. Moller
*Attorney, Agent, or Firm*—Andrus, Sceales, Starke & Sawall

[57] ABSTRACT

A rotary variable differential transducer has first and second coil portions (50a and 50b) of a primary coil overwound by respective secondary coils (52 and 54). Pole pieces (42 and 44) are asymmetrically arranged about the axis of rotor (16) and are inductively associated with the first and second coil portions (50a and 50b), respectively. The rotor (16) has first and second formations which are respectively defined by front and rear arcuate portions (70b and 70c) associated with the pole pieces (42 and 44), respectively. The pole pieces (42 and 44) are mutually angularly displaced about the axis of the rotor (16). The first and second coil portions (50a and 50b) are mutually axially displaced relative to the rotor (16) and an intermediate common pole piece (32b) is disposed between them. An intermediate formation defined by an annular peripheral portion (70a) on the rotor (16) lies adjacent the common pole piece (32b), an output which is indicative of the angular position of the rotor (16) is taken from the second coils (52 and 54).

10 Claims, 2 Drawing Sheets

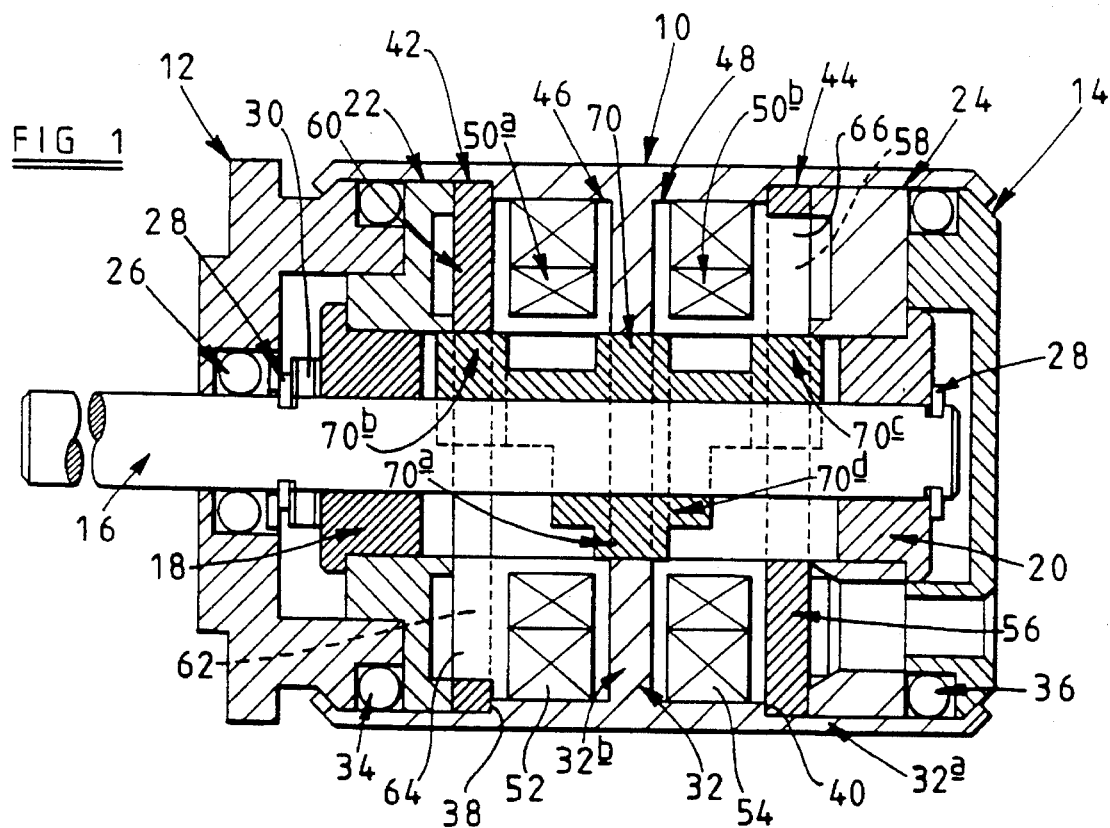
FIG 1
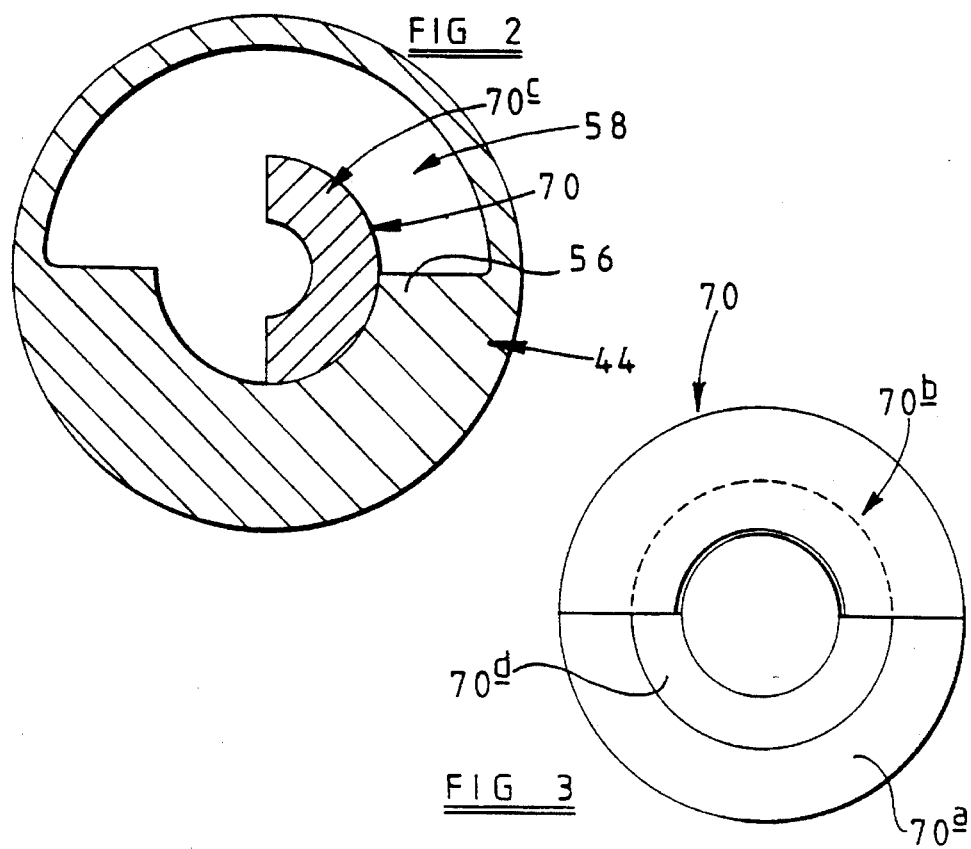
FIG 2
FIG 3

ROTARY TRANSDUCER

BACKGROUND OF THE INVENTION

This invention relates to a rotary transducer and is more particularly, but not exclusively, concerned with a rotary variable transducer, especially a rotary variable differential transducer.

It has been previously proposed to provide a rotary variable differential transducer having a body in which a primary and two secondary coils are wound on respective portions of a stator, such portions being equally-angularly spaced about the axis of rotation of a rotor mounted on a shaft in a plane perpendicular to the shaft. Each such stator portion extends over the same length of the rotor and carries an arcuate pole piece which is disposed close to the peripheral surface of the rotor. The rotor has an asymmetric pole piece which is arranged relative to the stator pole pieces associated with the primary coil and the secondary coils such that, upon angular movement of the shaft about its axis of rotation, the inductive coupling between the primary coil and one of the secondary coils increases whilst there is a corresponding decrease in the inductive coupling between the primary coil and the other of the secondary coils. The electrical output signals from the secondary coils can then be compared to give an indication of the angular position of the shaft relative to the body. Such a construction of transducer is relatively complicated to manufacture and can be difficult to assemble. Additionally, it does not have a particularly compact construction and the effective angular range is limited to ±60° max approx. The linearity of signal output is dependent on the eddy current effects in the pole pieces. Use of solid magnetic pole pieces is desirable for constructional simplicity but eddy currents cannot be ignored in these. While eddy currents can be minimised by constructing the poles from thin laminations, their use makes assembly difficult and mechanical accuracy poor.

GB-A-2231161 discloses a rotary position transducer having a fixed primary coil which is substantially coaxial with a rotor shaft, and two fixed secondary coils symmetrically disposed on opposite sides of the primary coil axis with their common axis at right angles to that of the primary coil. The rotor shaft carries an asymmetrical rotor which provides inductive coupling between the primary coil and each of the secondary coils. The asymmetry causes the combined output of the secondary coils to vary, possibly linearly, with the angular position of the rotor. With such a construction it is also relatively difficult to achieve consistent results in manufacture and signal output is low due to poor magnetic coupling through the relatively large air gap between the rotor and the stator pole pieces. The linear range is also limited to about ±45° to ±60°.

SUMMARY OF THE INVENTION

It is an object of the present invention to provide an improved rotary transducer which can be capable of operating over a large angular range of up to ±90° and which can be of compact construction, easy to manufacture and efficient in operation.

According to the present invention, there is provided a rotary transducer comprising a first electrical coil, an electrical output, and an inductive coupling which inductively couples said electrical output with the first electrical coil and which includes a rotor rotatable about an axis relative to said first electrical coil so that, in use, the electrical output varies in dependence upon the angular position of said rotor about said axis, wherein the first electrical coil comprises first and second coil regions which are mutually displaced axially of the rotor, and wherein the rotor has first and second formations thereon which are mutually axially displaced and which are respectively inductively associated with the first and second coil regions of the first electrical coil.

In the rotary transducer according to the present invention, the arrangement is such that, in use, as the rotor is rotated, the strengths of the magnetic fluxes in magnetic circuits associated with the first and second coil regions of the first electrical coil vary so as to enable a signal to be obtained at the output which is indicative of the rotary position of the rotor.

Preferably, the rotary transducer includes first and second stator pole pieces inductively associated respectively with the first and second coil regions of the first electrical coil, each pole piece being asymmetrically arranged about the axis of the rotor, and at least one of the first pole piece and the first formation on the rotor being angularly displaced about the axis of the rotor relative to at least one of the second pole piece and the second formation on the rotor.

The rotary transducer preferably further includes a common stator pole piece which is disposed between the first and second coil regions and which is inductively associated with both of said coil regions. The rotor preferably has an intermediate formation thereon which is disposed between the first and second formations and which lies adjacent the common stator pole piece. With such an arrangement, the intermediate formation on the rotor may have a continuous outer peripheral surface which lies adjacent a continuous internal peripheral surface of the common stator pole piece, or the intermediate formation on the rotor may have a discontinuous outer peripheral surface which lies adjacent a discontinuous inner peripheral surface of the common stator pole piece.

The present invention is applicable to rotary transducers of the type wherein the first electrical coil is a primary coil and the electrical output is taken from one or more secondary coils which is/are variably inductively coupled to the first electrical coil via the rotor. The present invention is also applicable to rotary transducers of the type where the electrical output is obtained across one of said first and second coil regions, or by comparing the electrical outputs across the respective first and second coil regions. With such an arrangement, there are no secondary coils.

In a preferred embodiment, two secondary coils are provided which are respectively inductively associated with the first and second coil regions of the first electrical coil.

Whilst in the above description, the first electrical coil has been described as comprising first and second coil regions, it is to be appreciated that, in practice, such first and second coil regions may be comprised of individually wound coils connected together in series so as to define, in effect, two or more portions of the same coil.

The two portions of said coil may be connected to produce the magnetic flux in the 2 halves of the rotor either to be in the same direction or to be in opposite directions.

The benefits gained in this design are:
1. Angular range up to ±90°.
2. Capable of achieving ±0.1% linearity over a range of ±80°.
3. Winding of the coils on to bobbins requires no special winding technique or special tools.
4. Enables the use of low cost, flat laminated pole pieces to minimise eddy current distortion of the magnetic flux density in the air gaps.

5. Easy to produce pole faces concentric with the shaft axis and thus achieve small air gaps with consequent high magnetic efficiency.

BRIEF DESCRIPTION OF THE DRAWINGS

An embodiment of the present invention will now be described, by way of example, with reference to the accompanying drawing, in which:

FIG. 1 is an axial section through a rotary variable transducer according to one example of the present invention, FIG. 2 is a cross-sectional view showing part of a stator and part of a rotor of the transducer of FIG. 1, with the rotor being illustrated in a "null" position, and FIG. 3 is an end view of the rotor of FIGS. 1 and 2.

DETAILED DESCRIPTION OF THE DRAWINGS

Figure 4:
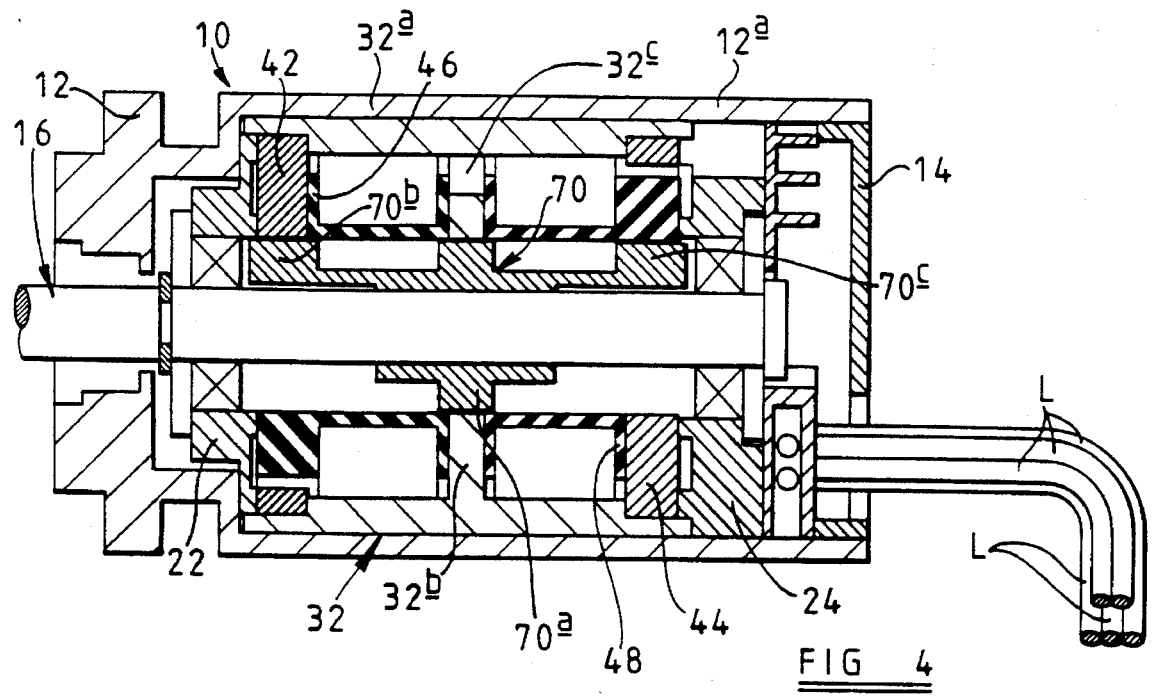
FIG. 4 is an axial section through an alternative embodiment of rotary variable transducer.

Referring now to FIGS. 1 to 3 of the drawings, the transducer comprises a generally cylindrical body 10 including front and rear end caps 12 and 14, and a shaft 16 mounted coaxially within the body 10. The shaft 16 is mounted in front and rear bearings 18 and 20 for rotation about its longitudinal axis relative to the body 10. The bearings 18 and 20 are respectively carried by front and rear bearing housings 22 and 24 forming part of the body 10. The shaft 16 projects externally of the body 10 through end cap 12 and is sealed relative thereto by means of an O-ring seal 26. Spring clips 28 and a thrust washer 30 locate the shaft 16 relative to the body 10 and load the bearings 18 and 20. Alternatively, the right hand spring clip 28 (as viewed in FIG. 1) may be replaced by a screw (not shown) which extends axially into the end of the shaft 16 and which has a head engaging the respective bearing 20. Such screw provides a convenient way of pre-loading the bearings 18 and 20.

The body 10 further includes a main stator member 32 consisting of an outer cylindrical sleeve 32a with a central, inwardly extending annular flange 32b. Opposite ends of the sleeve 32a are spun-over to engage with the end caps 12 and 14, respectively, in order to hold the assembly together. O-ring seals 34 and 36 serve respectively to seal the joints between the wall 32a and the end caps 12 and 14. The inner surface of the wall 32a is stepped on each side of the flange 32b so as to define annular abutment shoulders 38 and 40. Front and rear stator pole pieces 42 and 44 are trapped between the respective abutment shoulders 38 and 40 and the respective front and rear bearing housing's 22 and 24.

Front and rear coil bobbins 46 and 48 are respectively held in position by the pole pieces 42 and 44 against opposite sides of the central annular flange 32b of the main stator member 32.

The front coil bobbin 46 contains a first coil portion 50a of a first electrical coil which is defined by a primary coil. The first coil portion 50a is overwound by a first secondary coil 52. The rear coil bobbin 48 contains a second coil portion 50b of the primary coil overwound by a second secondary coil 54. The axes of coil portions 50a and 50b and of the secondary coils 52 and 54 are coincident with the axis of rotation of the shaft 16. The main stator body 32 has its longitudinal axis coincident with that of the shaft 16 also.

The front and rear stator pole pieces 42 and 44 are both identical but are asymmetrical about the axis of shaft 16. The shape of the rear stator pole piece 44 is illustrated in FIG. 2. The front stator pole piece 42 has a similar shape but is mounted in the housing 10 in an orientation which is 180° displaced relative to the rear stator pole piece 44. As can be seen from FIG. 2, the pole piece 44 has a solid region 56 which subtends an angle of 180° at the axis, and a hollow region 58 of similar shape. The front stator pole piece 42 has corresponding solid and hollow regions 60 and 62, respectively (see FIG. 1). Arcuate abutment lugs 64 and 66 on the respective bobbins 46 and 48 engage in the respective hollow regions 62 and 58 of the pole pieces 42 and 44 to ensure that these parts are assembled in the correct mutual dispositions.

The rotary transducer further comprises a rotor 70 which is mounted on the shaft 16 and fixed for rotation therewith. The rotor 70 includes an intermediate formation defined by a centrally disposed annular peripheral portion 70a whose surface lies closely adjacent the inner periphery of the annular flange 32b of the main stator member 32. The rotor 70 further includes first and second formations which are respectively defined by front and rear arcuate portions 70b and 70c which are disposed at opposite axial ends of the rotor 70 in spaced relationship to the central annular peripheral portion 70a and which are disposed opposite the respective front and rear stator pole pieces 42 and 44. Each arcuate region 70b, 70c subtends an arc of 180° about the longitudinal axis of shaft 16. The arcuate members 70b and 70c of the rotor 70 are mutually aligned in the longitudinal direction of extent of the rotor 70, as will be apparent from a consideration of FIGS. 1 and 3. For convenience, FIG. 2 only shows portion 70c of the rotor 70, such portion 70c being displaced by 90° as compared with its orientation as depicted in FIG. 1.

The rotor 70 further includes an intermediate sleeve portion 70d by means of which the portions 70a and 70c are mounted on the shaft 16. Portions 70a to 70d are of unitary constructions and, like the stator, are formed of a suitable ferromagnetic material. The coil bobbins 46 and 48 are formed of a suitable insulating material such as a synthetic polymer.

In use, the first and second coil portions 50a and 50b are connected in series circuit with a suitable AC power supply. Output voltages are induced in the secondary coils 52 and 54, the magnitude of which being dependent upon the strength of the magnetic flux in the magnetic circuit which inductively couples each secondary coil 52, 54 with its respective first or second primary coil portion 50a, 50b. The magnetic circuit affecting secondary coil 52 is primarily that which exists in the surrounding circuit defined by portions 70a, 70d and 70b of the rotor 70, the front stator pole piece 42, the adjacent region of sleeve 32a, and the central flange 32b of the main stator member 32. In contrast, the magnetic circuit which mainly affects the secondary coil 54 is that which exists in portions 70a, 70d and 70c of the rotor 70, the rear stator pole piece 44, the adjacent portion of the wall 32a and the central flange 32b of the main stator member 32. The central flange 32b defines a central pole piece which is common to both of these magnetic circuits. The strength of the magnetic flux in each of such circuits depends to a very great extent upon the magnetic reluctance of any air gaps in such circuit. With the rotor 70 in the position illustrated in FIG. 1, it will be seen that the arcuate portion 70b of the rotor 70 lies very closely adjacent the solid region 60 of the front stator pole piece 42. Since the portion 70a is always very closely adjacent the central annular flange 32b of the rotor 70, it follows that there are only minimal air gaps in the magnetic circuit which primarily affects the secondary coil 52 and the magnetic flux will be high. As a result, the voltage which is induced in the secondary coil 52 is relatively high. In contrast, as will be seen from FIG. 1, the arcuate portion 70c of the rotor 70 lies opposite the hollow region 66 in the rear stator pole piece 44. The result of this is that there is a relatively large air gap in the magnetic circuit which primarily affects the secondary coil 54. As a result of this, the magnetic flux coupling with secondary coil, 54, and the voltage which is induced in it is relatively lower than that in secondary coil 52. It will also be appreciated that, as the shaft 16 is rotated from the position illustrated in FIG. 1, there is a progressive decrease in the voltage induced in secondary coil 52 and a corresponding progressive increase in that which is induced in the secondary coil 54. In the position illustrated in FIG. 2, the air gaps in the magnetic circuits associated with the secondary coils 52 and 54 respectively are the same and this corresponds to a "null" position of the transducer. It will therefore be appreciated that monitoring the difference in the signals from the secondary coils 52 and 54 enables accurate monitoring of the rotational position of the shaft 16 relative to the body 10.

Referring now to FIG. 4, there is illustrated an alternative embodiment which measures only 12.7 mm diameter×24 mm axial length and which also incorporates screening from the effects of external magnetic fields. Parts which are similar to the embodiment of FIGS. 1 to 3 are accorded the same reference numerals. In this embodiment, end cap 12 is formed of a ferromagnetic material and is extended axially so as to define an outer sleeve 12a in whose otherwise open end the ferromagnetic end cap 14 is sealingly secured. The sleeve 32a is disposed internally of the sleeve 12a with a small (>0.1 mm) concentric gap (not shown) between the two achieved through spacers (not shown). This gap acts to separate sleeves 32a and 12a magnetically and thereby achieves magnetic shielding/screening of the inner magnetic circuits from external magnetic influences. In FIG. 4, the section chosen is such that an aperture 32c for connecting leads is illustrated as passing through flange 32b. A similar aperture passes through flange 32b in the embodiment of FIG. 1, but it cannot be seen because of the section chosen. In FIG. 4, coils corresponding to the coils 50a, 50b, 52 and 54 of FIG. 1 are present but are not illustrated. Leads L are connected to such coils but are not fully illustrated in FIG. 4.

Figure 5:
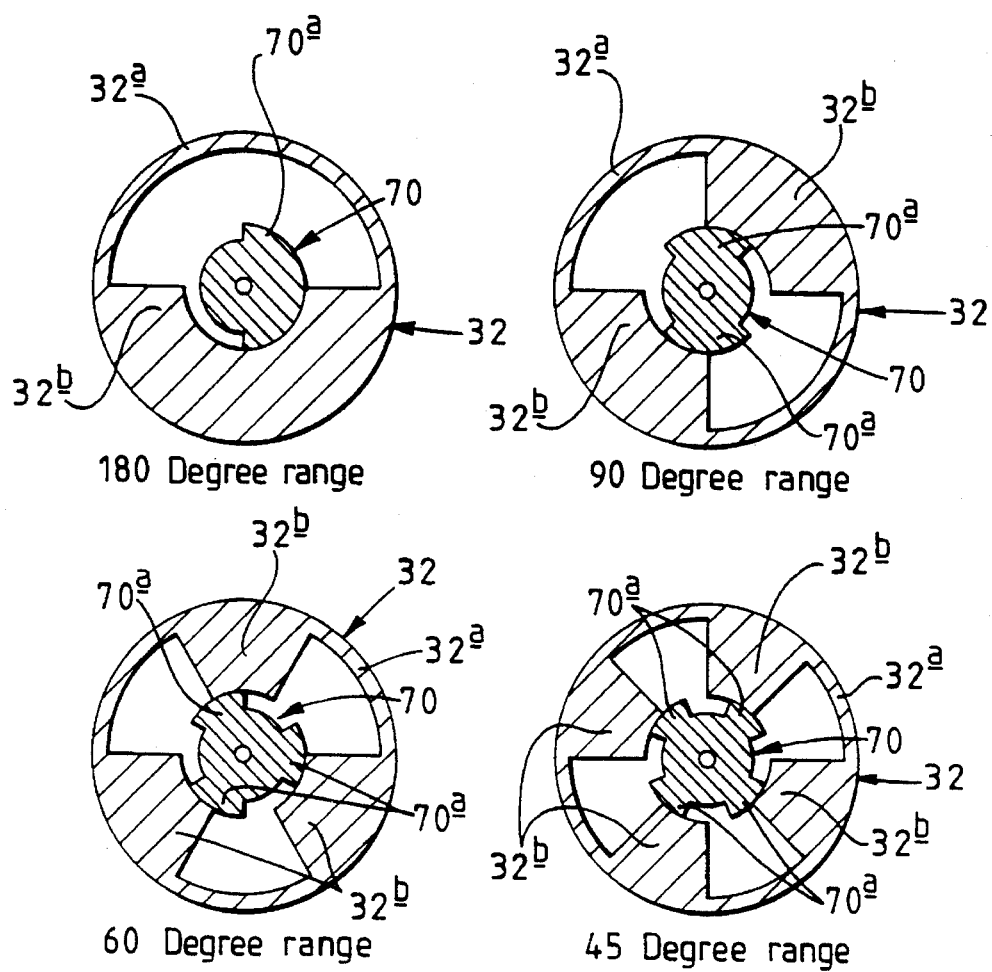
FIG. 5 shows different designs of main stator members and rotors for applications where various angular operating ranges are required with the same full scale output voltage variation.

FIG. 5 shows various designs of main stator member 32 and rotor 70 for different angular operating ranges with the same full scale output voltage variation.

The rotary variable transducers as described above are simple to assemble and are of extremely compact construction.

The design also has the advantage of mitigating the effect of eddy currents on the linearity of output signals from the secondary coils either by using pole pieces 42 and 44 made of solid ferrite material or of laminated metal construction, e.g. a stack of 30×0.05 mm thick silicon iron laminations.

In an alternative embodiment to those described above, the secondary coils 52 and 54 are wound on respective coil bobbins which are disposed laterally adjacent the respective coil bobbins 46 and 48 so as to lie respectively to the front and rear of the bobbins 46 and 48.

In any of the above-described embodiments, the pole pieces 42 and 44 may be arranged in the same orientation i.e., with their solid regions 56 mutually aligned and their hollow regions 58 mutually aligned. With such an arrangement, the front and rear arcuate portions 70b and 70c are mutually angularly displaced by 180° instead of being mutually aligned in the longitudinal direction of extent of the rotor 70.

The invention is considered to reside in any one or more of the following features:
1. A shaft angle sensor in which 2 or more differential magnetic circuits are mutually displaced along the axis of the shaft.
2. A shaft angle sensor in which the axis of the coil(s) or coil sections coincides with the axis of the shaft.
3. A combination of 1 and 2 above but with axially separated primary coil portions only and output signal(s) taken from junction of such coil portions.
4. A shaft angle sensor in which the primary and secondary coils (or coil sections) are wound one on top of the other or as a bifilar pair of coils on the same former (or formers).
5. A sensor as in 4 above, in which the magnetic flux coupling any pair of portions of the primary and secondary coils is varied by the reluctance of the air gap(s) between a rotor and stator portion.
6. A sensor as in 1, 2, 4 or 5 above in which the differential secondary coil portions are connected with voltages in series opposition or in series aiding.

I claim:

1. A rotary transducer comprising a first electrical coil, leads for electrically connecting said first electrical coil to an AC power supply, an electrical output, and an inductive coupling which inductively couples said electrical output with the first electrical coil and which includes a rotor rotatable about an axis relative to said first electrical coil so that, in use, the electrical output varies in dependence upon the angular position of said rotor about said axis, wherein the first electrical coil comprises first and second coil portions which are mutually displaced axially of the rotor, and wherein said inductive coupling include (a) first and second pole pieces associated respectively with said first and second coil portions and (b) first and second formations on said rotor, said first and second formations being (i) disposed radially inwardly of the respective first and second pole pieces relative to said axis, (ii) mutually axially displaced along the rotor and (iii) respectively inductively associated with the first and second coil portions of the first electrical coil via said first and second pole pieces.

2. A rotary transducer as claimed in claim 1, further including first and second stator pole pieces inductively associated respectively with the first and second coil portions of the first electrical coil, each pole piece being asymmetrically arranged about the axis of the rotor, and wherein at least one of the first pole piece and the first formation on the rotor is angularly displaced about the axis of the rotor relative to at least one of the second Dole piece and the second formation on the rotor.

3. A rotary transducer as claimed in claim 1, further including a common stator pole piece which is disposed between the first and second coil portions and which is inductively associated with both of said coil portions.

4. A rotary transducer as claimed in claim 3, wherein the rotor has an intermediate formation thereon which is disposed between the first and second formations and which lies adjacent the common stator pole piece.

5. A rotary transducer as claimed in claim 4, wherein the intermediate formation on the rotor has a continuous outer peripheral surface which lies adjacent a continuous internal peripheral surface of the common stator pole piece.

6. A rotary transducer as claimed in claim 1, wherein the first electrical coil is a primary coil, and the electrical output is taken from at least one secondary coil which is variably inductively coupled to the first electrical coil via the rotor.

7. A rotary transducer as claimed in claim 1, wherein the electrical output is obtained across one of said first and second coil portions.

8. A rotary transducer as claimed in claim 1, wherein the electrical output is obtained by comparing the electrical outputs across the respective first and second coils portions.

9. A rotary transducer as claimed in claim 1, wherein two secondary coils are provided which are respectively inductively associated with the first and second coil portions of the first electrical coil.

10. A rotary transducer comprising a first electrical coil, leads for electrically connecting said first electrical coil to an AC power supply, an electrical output, and an inductive coupling which inductively couples said electrical output with the first electrical coil and which includes a rotor rotatable about an axis relative to said first electrical coil so that, in use, the electrical output varies in dependence upon the angular position of said rotor about said axis, wherein the first electrical coil comprises first and second coil portions which are mutually displaced axially of the rotor, and wherein said inductive coupling includes (a) first and second pole pieces associated respectively with said first and second coil portions and (b) first and second formations on said rotor, said first and second formations being (i) disposed radially inwardly of the respective first and second pole pieces relative to said axis, (ii) mutually axially displaced along the rotor and (iii) respectively inductively associated with the first and second coil portions of the first electrical coil via said first and second pole pieces, a common stator pole piece disposed between and inductively associated with said first and second coil portions, said rotor having an intermediate formation disposed between the first and second formations, said intermediate formation having a discontinuous outer peripheral surface which lies adjacent a discontinuous inner peripheral surface of said common stator pole piece.

* * * * *